United States Patent
Campagnolo Guizilini et al.

(10) Patent No.: US 12,293,548 B2
(45) Date of Patent: May 6, 2025

(54) SYSTEMS AND METHODS FOR ESTIMATING SCALED MAPS BY SAMPLING REPRESENTATIONS FROM A LEARNING MODEL

(71) Applicant: Toyota Research Institute, Inc., Los Altos, CA (US)

(72) Inventors: Vitor Campagnolo Guizilini, Santa Clara, CA (US); Igor Vasiljevic, San Mateo, CA (US); Dian Chen, San Jose, CA (US); Adrien David Gaidon, San Jose, CA (US); Rares A. Ambrus, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 68 days.

(21) Appl. No.: 18/486,619

(22) Filed: Oct. 13, 2023

(65) Prior Publication Data
US 2024/0354991 A1 Oct. 24, 2024

Related U.S. Application Data

(60) Provisional application No. 63/461,014, filed on Apr. 21, 2023.

(51) Int. Cl.
*G06T 7/80* (2017.01)
*G06T 7/50* (2017.01)

(52) U.S. Cl.
CPC ............ *G06T 7/80* (2017.01); *G06T 7/50* (2017.01); *G06T 2207/10028* (2013.01); *G06T 2207/20081* (2013.01)

(58) Field of Classification Search
CPC ... G06T 7/50; G06T 7/80; G06T 2207/10028; G06T 2207/20081
See application file for complete search history.

(56) References Cited

U.S. PATENT DOCUMENTS

| | | | | |
|---|---|---|---|---|
| 4,439,157 A | * | 3/1984 | Breglia | G02B 27/0172 359/618 |
| 6,543,899 B2 | * | 4/2003 | Covannon | G02B 27/017 353/11 |

(Continued)

FOREIGN PATENT DOCUMENTS

| | | |
|---|---|---|
| CN | 109886388 A | 6/2019 |
| CN | 110147892 A | 8/2019 |
| CN | 114359838 A | 4/2022 |

OTHER PUBLICATIONS

Zhao et al., "Geometry-aware symmetric domain adaptation for monocular depth estimation," Proceedings of the IEEE/CVF Conference on Computer Vision and Pattern Recognition (CVPR), 2019, pp. 9788-9798.

(Continued)

*Primary Examiner* — Michael B. Pierorazio
(74) *Attorney, Agent, or Firm* — Christopher G. Darrow; Darrow Mustafa PC

(57) ABSTRACT

Systems, methods, and other embodiments described herein relate to estimating scaled depth maps by sampling variational representations of an image using a learning model. In one embodiment, a method includes encoding data embeddings by a learning model to form conditioned latent representations using attention networks, the data embeddings including features about an image from a camera and calibration information about the camera. The method also includes computing a probability distribution of the conditioned latent representations by factoring scale priors. The method also includes sampling the probability distribution to generate variations for the data embeddings. The method also includes estimating scaled depth maps of a scene from the variations at different coordinates using the attention networks.

20 Claims, 5 Drawing Sheets

(56) References Cited

U.S. PATENT DOCUMENTS

| | | | | |
|---|---|---|---|---|
| 6,652,104 | B2* | 11/2003 | Nishida | H04N 9/3185 353/69 |
| 6,877,863 | B2* | 4/2005 | Wood | H04N 9/3185 353/42 |
| 7,070,283 | B2* | 7/2006 | Akutsu | H04N 5/74 353/30 |
| 7,119,965 | B1 | 10/2006 | Rolland | G02B 27/0172 359/630 |
| 7,182,466 | B2* | 2/2007 | Sunaga | H04N 5/74 353/69 |
| 7,270,421 | B2* | 9/2007 | Shinozaki | G03B 21/142 353/121 |
| 7,359,575 | B2* | 4/2008 | Bassi | G06T 3/18 345/427 |
| 7,441,906 | B1* | 10/2008 | Wang | G03B 21/14 353/121 |
| 7,782,387 | B2* | 8/2010 | Azuma | H04N 25/68 359/662 |
| 8,676,427 | B1* | 3/2014 | Ferguson | G08G 1/0965 701/23 |
| 9,753,126 | B2* | 9/2017 | Smits | G01S 17/003 |
| 9,810,913 | B2* | 11/2017 | Smits | G02B 5/124 |
| 10,067,230 | B2* | 9/2018 | Smits | G01S 17/86 |
| 10,261,183 | B2* | 4/2019 | Smits | G01S 7/4868 |
| 10,379,220 | B1* | 8/2019 | Smits | G01S 7/4811 |
| 10,394,112 | B2* | 8/2019 | Johnson | A01M 1/223 |
| 10,473,921 | B2* | 11/2019 | Smits | G01S 17/87 |
| 10,591,605 | B2* | 3/2020 | Smits | G01S 17/42 |
| 10,663,626 | B2* | 5/2020 | Benitez | G02B 27/01 |
| 11,830,455 | B2* | 11/2023 | Schriever | G06F 3/16 |
| 2002/0051095 | A1* | 5/2002 | Su | H04N 9/3194 348/745 |
| 2002/0067466 | A1* | 6/2002 | Covannon | G02B 30/26 353/8 |
| 2002/0122161 | A1* | 9/2002 | Nishida | H04N 9/3194 353/70 |
| 2003/0191836 | A1* | 10/2003 | Murtha | H04L 67/02 709/224 |
| 2003/0210381 | A1* | 11/2003 | Itaki | H04N 5/74 353/70 |
| 2004/0156024 | A1* | 8/2004 | Matsuda | H04N 9/3185 353/70 |
| 2005/0046803 | A1* | 3/2005 | Akutsu | H04N 5/74 353/69 |
| 2005/0073661 | A1* | 4/2005 | Tamura | H04N 9/3194 353/70 |
| 2005/0151934 | A1* | 7/2005 | Akutsu | G03B 21/147 353/69 |
| 2005/0237492 | A1* | 10/2005 | Shinozaki | H04N 9/3185 353/69 |
| 2006/0098167 | A1* | 5/2006 | Sato | G03B 21/26 353/35 |
| 2006/0203207 | A1* | 9/2006 | Ikeda | H04N 9/3185 353/70 |
| 2007/0008344 | A1* | 1/2007 | Medina | G06T 15/10 345/647 |
| 2007/0257941 | A1* | 11/2007 | Plut | G06F 9/451 345/660 |
| 2007/0285626 | A1* | 12/2007 | Miyasaka | G03B 21/206 353/85 |
| 2009/0278999 | A1* | 11/2009 | Ofune | H04N 21/47 348/E3.048 |
| 2010/0002123 | A1* | 1/2010 | Nozaki | H04N 23/00 348/E5.022 |
| 2010/0045942 | A1* | 2/2010 | Furui | H04N 9/3194 353/69 |
| 2011/0085044 | A1* | 4/2011 | Noda | G03B 21/58 348/E5.133 |
| 2011/0210979 | A1* | 9/2011 | Furui | G03B 37/04 345/619 |
| 2011/0234994 | A1* | 9/2011 | Uchiyama | H04N 9/3185 353/121 |
| 2011/0285971 | A1* | 11/2011 | Oka | H04N 9/3185 353/70 |
| 2011/0292351 | A1* | 12/2011 | Ishii | H04N 9/3185 353/69 |
| 2013/0245877 | A1* | 9/2013 | Ferguson | G06V 20/56 701/23 |
| 2014/0303827 | A1* | 10/2014 | Dolgov | B60W 30/00 701/23 |
| 2015/0094897 | A1* | 4/2015 | Cuddihy | B60K 35/81 701/23 |
| 2015/0336502 | A1* | 11/2015 | Hillis | G05D 1/0088 701/23 |
| 2017/0240096 | A1* | 8/2017 | Ross | G05D 1/0212 |
| 2018/0158102 | A1* | 6/2018 | Choi | G06Q 30/0251 |
| 2020/0174130 | A1* | 6/2020 | Banerjee | B60R 11/04 |
| 2021/0004610 | A1* | 1/2021 | Huang | G01S 17/10 |
| 2021/0168440 | A1* | 6/2021 | Ho | H04N 21/43632 |
| 2021/0310823 | A1* | 10/2021 | Wilbers | G01C 21/3811 |
| 2021/0341310 | A1* | 11/2021 | Wilbers | G01C 21/26 |
| 2022/0171412 | A1* | 6/2022 | Cui | G08B 3/10 |
| 2022/0201262 | A1* | 6/2022 | Chen | H04N 9/3185 |
| 2022/0242430 | A1* | 8/2022 | Watano | B60W 50/10 |
| 2023/0010713 | A1* | 1/2023 | Park | G01S 17/88 |

OTHER PUBLICATIONS

Zhao et al., "Towards better generalization: Joint depth-pose learning without PoseNet," Proceedings of the IEEE/CVF Conference on Computer Vision and Pattern Recognition (CVPR), 2020, pp. 9151-9161.

Zheng et al., "Unsupervised scene adaptation with memory regularization in vivo," In IJCAI, Jan. 2021, article No. 150, pp. 1076-1082.

Zhou et al., "Moving indoor: Unsupervised video depth learning in challenging environments," Proceedings of the IEEE/CVF International Conference on Computer Vision (ICCV), 2019, pp. 8618-8627.

Zhou et al., "Unsupervised learning of depth and ego-motion from video," Proceedings of the IEEE Conference on Computer Vision and Pattern Recognition (CVPR), 2017, pp. 1851-1858.

Agarwal et al., "Attention attention everywhere: Monocular depth prediction with skip attention," In Proceedings of the IEEE/CVF Winter Conference on Applications of Computer Vision (WACV), Jan. 2023, pp. 5861-5870.

Bhat et al., "Adabins: Depth estimation using adaptive bins," Proceedings of the IEEE/CVF Conference on Computer Vision and Pattern Recognition (CVPR), 2021, pp. 4009-4018.

Bhat et al., "Localbins: Improving depth estimation by learning local distributions", Computer Vision—ECCV 2022, pp. 480-496.

Guizilini et al., "Sparse auxiliary networks for unified monocular depth prediction and completion," Proceedings of the IEEE/CVF Conference on Computer Vision and Pattern Recognition (CVPR), 2021, pp. 11078-11088.

Hendrycks et al., "Gaussian error linear units (gelus)," arXiv:1606.08415, 2016, pp. 1-9.

Jain et al., "Putting nerf on a diet: Semantically consistent few-shot view synthesis," Proceedings of the IEEE/CVF International Conference on Computer Vision (ICCV), 2021, pp. 5885-5894.

Li et al., "Binsformer: Revisiting adaptive bins for monocular depth estimation," arXiv:2204.00987, 2022, pp. 1-21.

Liu et al., "Va-depthnet: A variational approach to single image depth prediction," arXiv:2302.06556, 2023, pp. 1-21.

Loshchilov et al., "Decoupled weight decay regularization," arXiv:1711.05101, 2019, pp. 1-8.

Paszke et al., "Pytorch: An imperative style, high-performance deep learning library," In Advances in Neural Information Processing Systems 32, 2019, pp. 1-12.

Patil et al., "P3depth: Monocular depth estimation with a piecewise planarity prior," Proceedings of the IEEE/CVF Conference on Computer Vision and Pattern Recognition (CVPR), 2022, pp. 1610-1621.

Uhrig et al., "Sparsity invariant cnns," In 3DV, arXiv:1708.06500, 2017, pp. 1-16.

(56) References Cited

OTHER PUBLICATIONS

Yang et al., "Transformer-based attention networks for continuous pixel-wise prediction," Proceedings of the IEEE/CVF International Conference on Computer Vision (ICCV), 2021, pp. 16269-16279.

Mo et al., "Multi-Task Transformer with Relation-Attention and Type-Attention for Named Entity Recognition" ICASSP 2023-2023 IEEE International Conference on Acoustics, Speech and Signal Processing (ICASSP). IEEE, 2023.

Mital et al., "Neural Distributed Image Compression with Cross-Attention Feature Alignment," Proceedings of the IEEE/CVF Winter Conference on Applications of Computer Vision (WACV), 2023, pp. 2498-2507.

Hu et al., "A Variational Bayesian Approach to Learning Latent Variables for Acoustic Knowledge Transfer," IEEE International Conference on Acoustics, Speech and Signal Processing (ICASSP), Singapore, 2022, pp. 4041-4045.

Chakraborty et al., "Structural Attention-Based Recurrent Variational Autoencoder for Highway Vehicle Anomaly Detection." arXiv preprint arXiv:2301.03634 (2023).

He et al., "Distributional Drift Adaptation with Temporal Conditional Variational Autoencoder for Multivariate Time Series Forecasting," arXiv:2209.00654, Sep. 23, 2022, pp. 1-13.

Pagnoni et al., "Conditional Variational Autoencoder for Neural Machine Translation," arXiv:1812.04405, Dec. 11, 2018, pp. 1-9.

Yuan et al. "New crfs: Neural window fully-connected crfs for monocular depth estimation." arXiv preprint arXiv:2203.01502 (2022).

Antequera et al., "Mapillary planet-scale depth dataset," In European Conference on Computer Vision, 2020, pp. 589-604.

Bian et al., "Unsupervised depth learning in challenging indoor video: Weak rectification to rescue," ArXiv, abs/2006.02708, 2020, pp. 1-12.

Blei et al., "Variational inference: A review for statisticians," Journal of the American Statistical Association, 112(518), 2017, pp. 859-877.

Caesar et al., "nuScenes: A multi-modal dataset for autonomous driving," Proceedings of the IEEE/CVF Conference on Computer Vision and Pattern Recognition (CVPR), 2020, pp. 11621-11631.

Chawla et al., "Multi-modal scale consistency and awareness for monocular self-supervised depth estimation," IEEE International Conference on Robotics and Automation (ICRA), Xi'an, China, 2021, pp. 5140-5146.

Dong et al., "Towards real-time monocular depth estimation for robotics: A survey," in IEEE Transactions on Intelligent Transportation Systems, vol. 23, No. 10, Oct. 2022, pp. 16940-16961.

Eftekhar et al., "Omnidata: A scalable pipeline for making multitask mid-level vision datasets from 3d scans," Proceedings of the IEEE/CVF International Conference on Computer Vision (ICCV), 2021, pp. 10786-10796.

Eigen et al., "Depth map prediction using a multi-scale deep network," arXiv:1406.2283, 2014, pp. 1-9.

Facil et al., "CAM-Convs: Camera-Aware Multi-Scale Convolutions for Single-View Depth," Proceedings of the IEEE/CVF Conference on Computer Vision and Pattern Recognition (CVPR), 2019, pp. 11826-11835.

Fang et al., "Self-supervised camera self-calibration from video," 2022 International Conference on Robotics and Automation (ICRA), Philadelphia, PA, USA, 2022, pp. 8468-8475.

Fu et al., "Deep ordinal regression network for monocular depth estimation," Proceedings of the IEEE Conference on Computer Vision and Pattern Recognition (CVPR), 2018, pp. 2002-2011.

Garg et al., "Unsupervised CNN for single view depth estimation: Geometry to the rescue," In ECCV, 2016, pp. 1-16.

Geiger et al., "Vision meets robotics: The KITTI dataset," IJRR, 2013, pp. 1231-1237.

Geiger et al., "Are we ready for autonomous driving? the KITTI vision benchmark suite," 2012 IEEE Conference on Computer Vision and Pattern Recognition, Providence, RI, USA, 2012, pp. 3354-3361.

Godard et al., "Unsupervised monocular depth estimation with left-right consistency," Proceedings of the IEEE Conference on Computer Vision and Pattern Recognition (CVPR), 2017, pp. 270-279.

Godard et al., "Digging into self-supervised monocular depth prediction," Proceedings of the IEEE/CVF International Conference on Computer Vision (ICCV), 2019, pp. 3828-3838.

Gordon et al., "Depth from videos in the wild: Unsupervised monocular depth learning from unknown cameras," Proceedings of the IEEE/CVF International Conference on Computer Vision (ICCV), 2019, pp. 8977-8986.

Guizilini et al., "Multi-frame self-supervised depth with transformers," Proceedings of the IEEE/CVF Conference on Computer Vision and Pattern Recognition (CVPR), 2022, pp. 160-170.

Guizilini et al., "3D packing for self-supervised monocular depth estimation," Proceedings of the IEEE/CVF Conference on Computer Vision and Pattern Recognition (CVPR), 2020, pp. 2485-2494.

Guizilini et al., "Semantically-guided representation learning for self-supervised monocular depth," In ICLR, 2020, arXiv:2002.12319, pp. 1-14.

Guizilini et al., "Learning optical flow, depth, and scene flow without real-world labels," IEEE Robotics and Automation Letters, vol. 7, No. 2, Apr. 2022, pp. 3491-3498.

Guizilini et al., "Geometric unsupervised domain adaptation for semantic segmentation," Proceedings of the IEEE/CVF International Conference on Computer Vision (ICCV), 2021, pp. 8537-8547.

Guizilini et al., "Full surround mono-depth from multiple cameras," in IEEE Robotics and Automation Letters, vol. 7, No. 2, Apr. 2022, pp. 5397-5404.

Guizilini et al., "Depth field networks for generalizable multi-view scene representation," In IEEE/CVF International Conference on Computer Vision (ICCV), 2022, pp. 1-23.

Gurram et al., "Monocular depth estimation through virtual-world supervision and real-world SfM self-supervision," in IEEE Transactions on Intelligent Transportation Systems, vol. 23, No. 8, Aug. 2022, pp. 12738-12751.

He et al., "Deep residual learning for image recognition," In Proceedings of the IEEE Conference on Computer Vision and Pattern Recognition (CVPR), 2016, pp. 770-778.

Hussain et al., "RVMDE: Radar validated monocular depth estimation for robotics," Journal of latex class files, vol. 14, No. 8, Aug. 2021, pp. 1-9.

Jaegle et al., "Perceiver IO: A general architecture for structured inputs & outputs," arXiv:2107.14795, 2021, 29 pages.

Ji et al., "Monoindoor: Towards good practice of self-supervised monocular depth estimation for indoor environments," Proceedings of the IEEE/CVF International Conference on Computer Vision (ICCV), 2021, pp. 12787-12796.

Mei et al., "Instance adaptive self-training for unsupervised domain adaptation," In European Conference on Computer Vision (ECCV), 2020, pp. 415-430.

Kim et al., "Self-supervised surround-view depth estimation with volumetric feature fusion," In Advances in Neural Information Processing Systems, 2022, pp. 1-14.

Kullback et al., "On information and sufficiency," Ann. Math. Statist., vol. 22, No. 1, 1951, pp. 79-86.

Lee et al., "From big to small: Multi-scale local planar guidance for monocular depth estimation," arXiv:1907.10326, 2019, pp. 1-11.

Lee et al., "Patch-wise attention network for monocular depth estimation," In In Proceedings of the AAAI Conference on Artificial Intelligence, 2021, pp. 1873-1881.

Lee et al., "Spigan: Privileged adversarial learning from simulation," In corl, arXiv:1810.03756, 2019, pp. 1-14.

Li et al., "StructDepth: Leveraging the structural regularities for self-supervised indoor depth estimation," Proceedings of the IEEE/CVF International Conference on Computer Vision (ICCV), 2021, pp. 12663-12673.

Li et al., "Monoindoor++: towards better practice of self-supervised monocular depth estimation for indoor environments," in IEEE Transactions on Circuits and Systems for Video Technology, vol. 33, No. 2, Feb. 2023, pp. 830-846.

(56) References Cited

OTHER PUBLICATIONS

Silberman et al., "Indoor segmentation and support inference from RGBD images," In ECCV, 2012, pp. 1-14.

Ranftl et al., "Vision transformers for dense prediction," Proceedings of the IEEE/CVF International Conference on Computer Vision (ICCV), 2021, pp. 12179-12188.

Ranftl et al., "Towards robust monocular depth estimation: Mixing datasets for zero-shot cross-dataset transfer," in IEEE Transactions on Pattern Analysis and Machine Intelligence, vol. 44, No. 3, Mar. 1, 2022, pp. 1623-1637.

Shu et al., "Feature-metric loss for self-supervised learning of depth and egomotion," In ECCV, 2020, pp. 572-588.

Sun et al., "Scalability in perception for autonomous driving: Waymo open dataset," Proceedings of the IEEE/CVF Conference on Computer Vision and Pattern Recognition (CVPR), 2020, pp. 2446-2454.

Swami et al., "Do what you can, with what you have: Scale-aware and high quality monocular depth estimation without real world labels," Proceedings of the IEEE/CVF Conference on Computer Vision and Pattern Recognition (CVPR) Workshops, 2022, pp. 988-997.

Vaswani et al., "Attention is all you need," In NeurIPS, 2017, pp. 1-11.

Vu et al., "DADA: Depth-aware domain adaptation in semantic segmentation," Proceedings of the IEEE/CVF International Conference on Computer Vision (ICCV), 2019, pp. 7364-7373.

Wagstaff et al., "Self-supervised scale recovery for monocular depth and egomotion estimation," IEEE/RSJ International Conference on Intelligent Robots and Systems (IROS), Prague, Czech Republic, 2021, pp. 2620-2627.

Wang et al., "TartanAir: A dataset to push the limits of visual SLAM," IEEE/RSJ International Conference on Intelligent Robots and Systems (IROS), Las Vegas, NV, USA, 2020, pp. 4909-4916.

Wei et al., "SurroundDepth: Entangling surrounding views for self-supervised multi-camera depth estimation," Proceedings of The 6th Conference on Robot Learning, 2023, pp. 1-11.

Wu et al., "Toward practical monocular indoor depth estimation," Proceedings of the IEEE/CVF Conference on Computer Vision and Pattern Recognition (CVPR), 2022, pp. 3814-3824.

Yifan et al., "Input-level inductive biases for 3D reconstruction," Proceedings of the IEEE/CVF Conference on Computer Vision and Pattern Recognition (CVPR), 2022, pp. 6176-6186.

* cited by examiner

SYSTEMS AND METHODS FOR ESTIMATING SCALED MAPS BY SAMPLING REPRESENTATIONS FROM A LEARNING MODEL

CROSS-REFERENCE TO RELATED APPLICATIONS

This application claims benefit of U.S. Provisional Application No. 63/461,014, filed on, Apr. 21, 2023, which is herein incorporated by reference in its entirety.

TECHNICAL FIELD

The subject matter described herein relates, in general, to estimating depth maps from images, and, more particularly, to estimating scaled depth maps by sampling variational representations of an image using a learning model.

BACKGROUND

Vehicles acquire data from sensors for perceiving other vehicles, obstacles, pedestrians, and additional aspects of a surrounding environment. For example, a vehicle derives data from a light detection and ranging (LIDAR) sensor that uses light to scan the surrounding environment, while logic associated with the LIDAR analyzes the data to detect objects and other features of the surrounding environment. In further examples, a vehicle acquires images from a camera about the surrounding environment from which a system derives awareness about aspects of the surrounding environment. Images can improve perceptions of the surrounding environment so that systems such as automated driving systems (ADS) accurately estimate paths and navigate the vehicle.

In various implementations, vehicles implement learning models for estimating depth as further awareness about a surrounding environment that improves safety through avoiding hazards. For example, the learning model estimates depth by extracting various representations about a scene captured by an image. However, representations can be excessively rigid, utilize an arbitrary scale, and lack details for rapidly changing data, thereby demanding further images that increase computing costs. Such representations may also exhibit global properties about the scene but lack the local specificity demanded by an ADS and other complex tasks.

SUMMARY

In one embodiment, example systems and methods relate to estimating scaled depth maps by sampling variational representations of an image using a learning model. In various implementations, systems that estimate depth maps using multiple images in a learning model generate deterministic representations. In other words, similar images generate representations that are overly rigid for scaling although data within a scene varies. As such, the systems generate depth maps with reduced reliability from scaling irregularities and consume computing power from processing multiple images. Furthermore, systems training learning models for scaling depth maps using supervision can be geometrically limited to arbitrary scales. These systems encounter difficulties scaling images across domains from varying geometric properties of cameras. Therefore, in one embodiment, an estimation system implements a learning model that generates multiple depth maps from a similar input for a scene by maintaining latent vectors and sampling conditioned latent representations. Local information that factors global latent representations about a scene can form a conditioned latent representation for predictions by the estimation system amongst a real scale (e.g., a metric scale). Regarding encoding, the estimation system encodes data embeddings by projecting values onto a distribution of the latent vectors using a cross-attention network. The data embeddings may be features about the image and calibration information about a camera that captured the image. Furthermore, an encoder computes a probability distribution for the condition latent representations using the outputs of the cross-attention network and a self-attention network. Here, the self-attention network processes the latent vectors and the data embeddings for deeper learning about local information within the scene. In this way, the encoding quantifies data uncertainty from the image that improves decoding and depth estimates without scaling information.

In various implementations, a decoder samples the probability distribution to generate variations for the data embeddings that allows zero-shot learning by factoring scale priors. In zero-shot learning, a system predicts features (e.g., vehicle depth) about samples without observations during training. As such, the learning model is transferrable regardless of camera specifications and scene geometries since the decoder and the encoder are decoupled through sampling and zero-shot learning. Furthermore, the learning model infers the scale priors using known priors since the scale priors were unknown during training. For example, the known priors represent appearance characteristics about objects (e.g., street signs) that are absolute within the scene but lack depth. In this way, the estimation system accurately learns scale using data from a single-view rather than multiple-views (i.e., multiple cameras), thereby reducing system costs. Regarding the output, the estimation system predicts scaled depth maps using the image from the variations using a cross-attention network. Accordingly, the estimation system predicts scaled depth maps from a single image using probabilistic encoding and sampling that allows model transferability, thereby improving system robustness.

In one embodiment, an estimation system for estimating scaled depth maps by sampling variational representations of an image using a learning model is disclosed. The estimation system includes a memory including instructions that, when executed by a processor, cause the processor to encode data embeddings by a learning model to form conditioned latent representations using attention networks, the data embeddings including features about an image from a camera and calibration information about the camera. The instructions also include instructions to compute a probability distribution of the conditioned latent representations by factoring scale priors. The instructions also include instructions to sample the probability distribution to generate variations for the data embeddings. The instructions also include instructions to estimate scaled depth maps of a scene from the variations at different coordinates using the attention networks.

In one embodiment, a non-transitory computer-readable medium for estimating scaled depth maps by sampling variational representations of an image using a learning model and including instructions that when executed by a processor cause the processor to perform one or more functions is disclosed. The instructions include instructions to encode data embeddings by a learning model to form conditioned latent representations using attention networks, the data embeddings including features about an image from a camera and calibration information about the camera. The instructions also include instructions to compute a probability distribution of the conditioned latent representations by factoring scale priors. The instructions also include instructions to sample the probability distribution to generate variations for the data embeddings. The instructions also include instructions to estimate scaled depth maps of a scene from the variations at different coordinates using the attention networks.

In one embodiment, a method for estimating scaled depth maps by sampling variational representations of an image using a learning model is disclosed. In one embodiment, the method includes encoding data embeddings by a learning model to form conditioned latent representations using attention networks, the data embeddings including features about an image from a camera and calibration information about the camera. The method also includes computing a probability distribution of the conditioned latent representations by factoring scale priors. The method also includes sampling the probability distribution to generate variations for the data embeddings. The method also includes estimating scaled depth maps of a scene from the variations at different coordinates using the attention networks.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
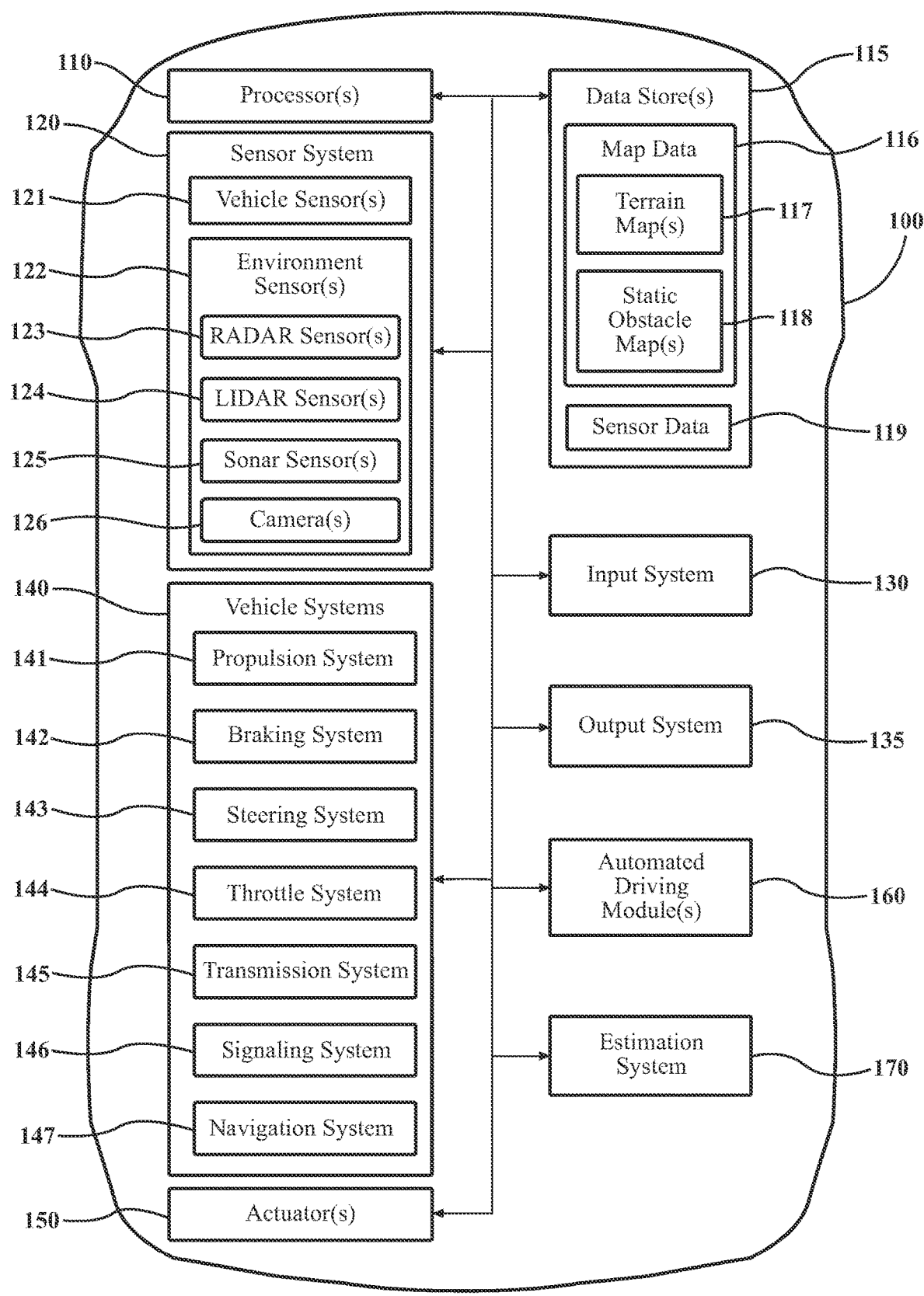
FIG. 1 illustrates one embodiment of a vehicle within which systems and methods disclosed herein may be implemented.

Systems, methods, and other embodiments associated with estimating scaled depth maps by sampling variational representations of an image using a learning model are disclosed herein. In various implementations, systems predicting depth maps from latent data encounter difficulties from deterministic representations. As such, these systems scaling data for the depth maps for camera properties (e.g., monocular cameras) that vary generate irregular and unreliable results for complex tasks (e.g., automated driving). On the other hand, supervised systems can train learning models to predict depth depths for varying geometries such as by annotating objects (e.g., a lightpost). However, the transferability of supervised learning models across different camera specifications produce inadequate accuracy demanded by complex tasks. Therefore, in one embodiment, an estimation system implements a learning model computing probability distributions for conditioned latent representations so that a decoder generates scaled depth maps through sampling the probability distributions. In this way, the estimation system outputs multiple depth maps from a single image that are accurately scaled to real instead of arbitrary scales (e.g., metric scale). In one approach, the learning model encodes data embeddings for generating features that describe observed structures (e.g., trees). A cross-attention network processes the features and the latent vectors that are variational and outputs an N×2D matrix. Here, N can represent the latent vectors maintained with 2D dimensionality such that one dimension stores the mean and the other has the standard deviation about the probability distributions for further processing.

Moreover, a self-attention network quantifies the conditioned latent representations as the probability distributions using the output of the cross-attention network. The conditioned latent representations have scene-level information that factors global latent representations about a scene, thereby factoring scale priors of the scene. In this way, the estimation system predicts the uncertainty of the data embeddings by computing the probabilistic distributions while decoupling from camera specifications, thereby improving transferability and system robustness.

In various implementations, a decoder samples the conditioned latent representations randomly from the probability distributions in pairs, thereby allowing zero-shot predictions by factoring scale priors. As such, the estimation system predicts features (e.g., vehicle depth) about samples which were not observed during training. Regarding computation details, the estimation system derives a matrix N×D for calculations by the cross-attention network. Here, depth outputs of the cross-attention network are computed using the calibration information that includes the geometric properties about the camera and the samples. In one approach, the decoder removes pixel locations having increased uncertainty from the scaled depth maps according to lighting (e.g., indoors, outdoors, etc.). In this way, the scaled depth maps adjust to scene changes from a single image, thereby improving speed demanded for tasks such as safety systems. Accordingly, the estimation system improves the estimation of scaled depth maps using single images and transferability regardless of camera geometries, thereby improving portability without increasing computing costs.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an estimation system 170 uses road-side units (RSU), consumer electronics (CE), mobile devices, robots, drones, and so on that benefit from the functionality discussed herein associated with estimating scaled depth maps by sampling variational representations of an image using a learning model.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an estimation system 170 that is implemented to perform methods and other functions as disclosed herein relating to estimating scaled depth maps by sampling variational representations of an image using a learning model.

Figure 2:
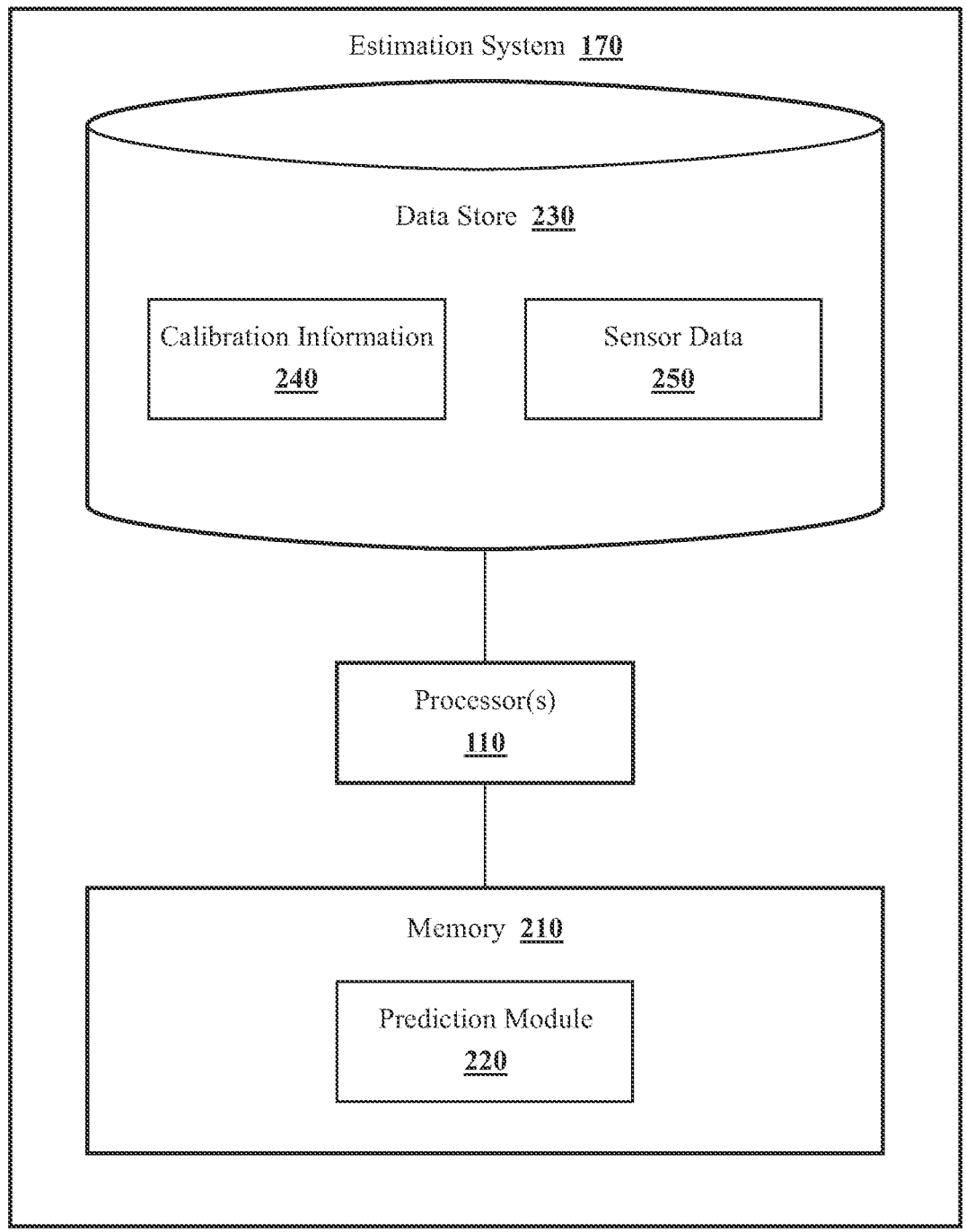
FIG. 2 illustrates one embodiment of an estimation system that is associated with estimating scaled depth maps by sampling latent representations of an image.

With reference to FIG. 2, one embodiment of the estimation system 170 of FIG. 1 is further illustrated. The estimation system 170 is shown as including a processor(s) 110 from the vehicle 100 of FIG. 1. Accordingly, the processor(s) 110 may be a part of the estimation system 170, the estimation system 170 may include a separate processor from the processor(s) 110 of the vehicle 100, or the estimation system 170 may access the processor(s) 110 through a data bus or another communication path. In one embodiment, the estimation system 170 includes a memory 210 that stores a prediction module 220. The memory 210 is a random-access memory (RAM), a read-only memory (ROM), a hard-disk drive, a flash memory, or other suitable memory for storing the prediction module 220. The prediction module 220 is, for example, computer-readable instructions that when executed by the processor(s) 110 cause the processor(s) 110 to perform the various functions disclosed herein.

The estimation system 170 as illustrated in FIG. 2 is generally an abstracted form of the estimation system 170 as may be implemented between the vehicle 100 and a cloud-computing environment. Furthermore, the prediction module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the prediction module 220, in one embodiment, acquires the sensor data 250 that includes at least camera images. In further arrangements, the prediction module 220 acquires the sensor data 250 from further sensors such as radar sensors 123, LIDAR sensors 124, and other sensors as may be suitable for identifying vehicles and locations of the vehicles.

Accordingly, the prediction module 220, in one embodiment, controls the respective sensors to provide the data inputs in the form of the sensor data 250. Additionally, while the prediction module 220 is discussed as controlling the various sensors to provide the sensor data 250, in one or more embodiments, the prediction module 220 can employ other techniques to acquire the sensor data 250 that are either active or passive. For example, the prediction module 220 may passively sniff the sensor data 250 from a stream of electronic information provided by the various sensors to further components within the vehicle 100. Moreover, the prediction module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the estimation system 170 includes a data store 230, such as a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the prediction module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the calibration information 240 about a camera (e.g., a monocular camera, a red-green-blue (RGB) camera, etc.). Instead of raw values, the calibration information 240 may have properties about a geometric model representing a camera. For example, the properties are focal length, aperture, orientation, field-of-view, resolution, and so on. Accordingly, the estimation system 170 uses values associated with these properties for predicting a scaled depth map instead of raw values, thereby simplifying computations and complexity.

Still referring to FIG. 2, the prediction module 220, in one embodiment, is further configured to perform additional tasks beyond controlling the respective sensors to acquire and provide the sensor data 250. For example, the prediction module 220 includes instructions that cause the processor(s) 110 to predict scaled depth maps independent of gaps caused by varying camera geometries. Furthermore, the estimation system 170 may implement a learning model that processes data embeddings using a zero-shot approach while limiting scaling computations. Here, the learning model jointly encodes calibration information about a camera with image features for predicting size and learning scale priors to improve predictions. The estimation system 170 also decouples encoding and decoding by computing conditional and global latent representations that are variational and probabilistic. In this way, the decoder can sample the conditioned latent representations to generate multiple predictions from probabilistic distributions instead of coupling through a direct connection. Regarding training, as explained below, the learning model minimizes losses to learn depth priors using scaled and labeled data from real-world and synthetic datasets that improves system transferability and robustness under changing lighting conditions (e.g., indoors, outdoors, etc.).

Figure 3:
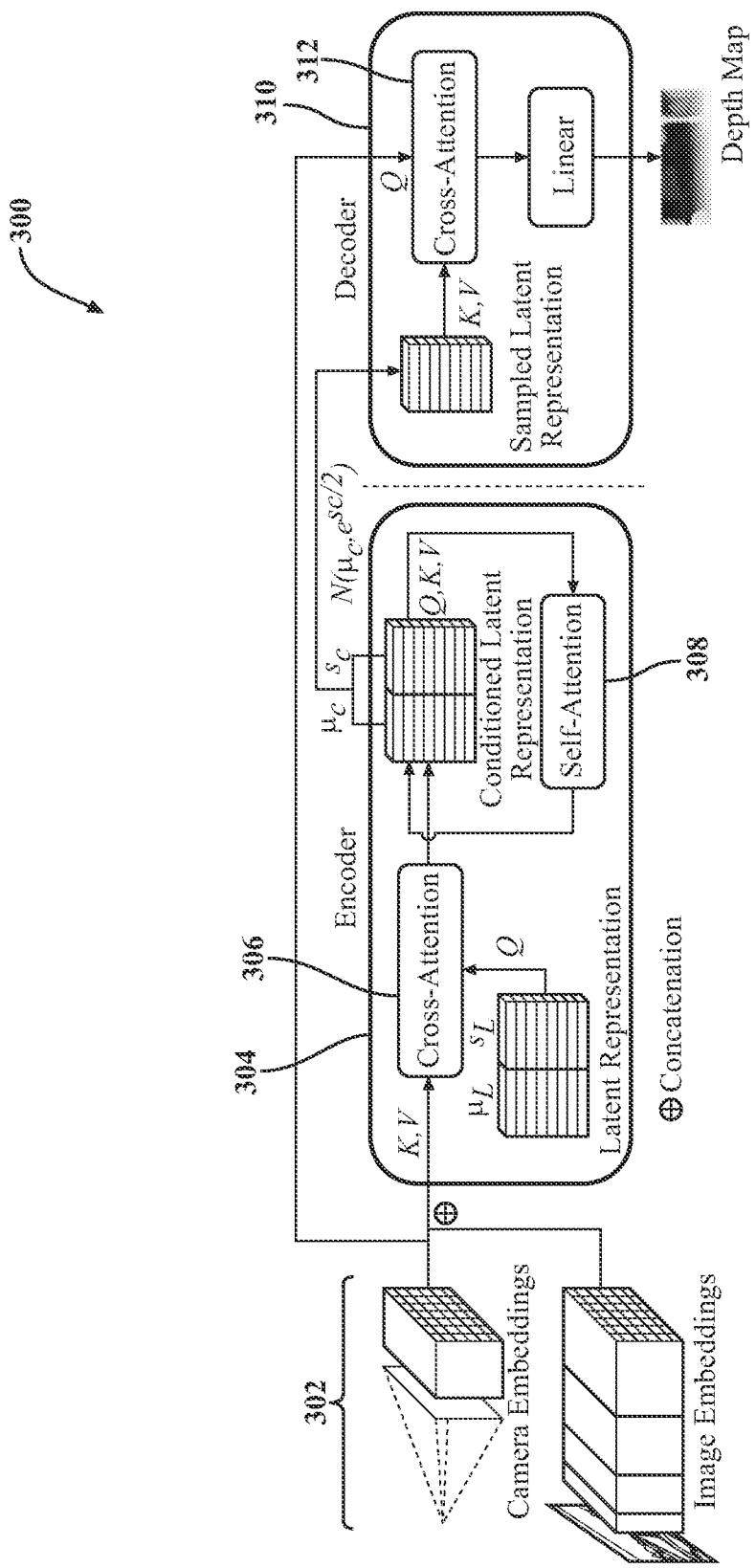
FIG. 3 illustrates one embodiment of the estimation system having an encoder generating probabilistic distributions of latent representations for sampling and generating the scaled depth maps.

Now turning to FIG. 3, one embodiment of the estimation system 170 having an encoder generating probabilistic distributions of latent representations for sampling and generating the scaled depth maps is illustrated. The learning model 300 improves transformer-based perception that suffers from quadratic scaling of self-attention for data projections. Furthermore, the learning model 300 through zero-shot learning and factoring scale priors predicts features (e.g., vehicle depth) about samples which were not observed during training. In this way, the learning model 300 is transferrable notwithstanding the calibration information 240 and scene geometries since the decoder and the encoder are decoupled through sampling instead of a direct connection and zero-shot learning. Furthermore, the learning model 300 generates depth maps having real instead of arbitrary scales (e.g., metric scale), thereby expanding applications for the estimation system 170.

In FIG. 3, the learning model 300 can learn a $N_l \times D_l$ latent representation $\mathfrak{R}$ and project $N_e \times D_e$ encoding embeddings onto this latent representation using a cross-attention network. In one approach, the learning model 300 executes self-attention in a lower-dimensional space of the cross-attention network for forming the conditioned latent representation $\mathfrak{R}_c$. As explained below, a decoder that can query $\mathfrak{R}_c$ using $N_d \times D_d$ embeddings to estimate scaled depth maps having improved accuracy.

In various implementations, the learning model 300 computes the data embeddings 302 from monocular camera data for depth map estimates that factor scale priors. The estimation system 170 can preprocess data (e.g., red-green-blue (RGB) values) acquired from one or more camera(s) 126 to extract features and include the features in the data embeddings 302. As previously explained, the data embeddings 302 can include the calibration information 240 having properties about a geometric model representing the monocular camera. For example, the properties are focal length, aperture, orientation, field-of-view, resolution, and so on. As such, the estimation system 170 uses the extracted features and camera properties instead of raw values for predicting a scaled depth map that simplifies computations.

Regarding details of the image embeddings, an image encoder may process an input H×W×3 as image $I_t$ and generate feature maps at increasingly decreased resolutions and increased dimensionalities. For example, feature maps at ¼ a resolution are concatenated with decreased-resolution feature maps that are bilinearly upsampled. Accordingly, this results in H/4×W/4×960 image embeddings $\varepsilon_I$ that the estimation system 170 encodes into frame-specific visual information (e.g., color, brightness, etc.) onto the latent representation $\mathfrak{R}$.

Now turning to encoding details, variational computations are executed by the encoder 304 for approximating probability distributions with means $\mu_L$ and deviations $s_L$ about the latent representations. In particular, $s_L$ represents the log-variance of the standard deviation $\sigma$ that can have more numerical stability than $\sigma$. For example, given the input embeddings $\varepsilon$, the posterior over the latent representation $\mathfrak{R}$ is approximated by a variational distribution Q ( $\mathfrak{R}$) such that P( $\mathfrak{R}|\varepsilon$)≈Q( $\mathfrak{R}$). Here, the estimation system 170 can maintain R as a variational latent representation with global significance to the dataset for conditioning using a single image, thereby simplifying implementations. A cross-attention network 306 compares the data embeddings K and V with Q( $\mathfrak{R}$), that can represent global observances about a dataset. In particular, K are keys, V values, and Q queries used to identify relationships in layers by attention networks of the learning model 300 as described below.

In one approach, the learning model 300 maintains R as latent vectors and projects the data embeddings on the latent vectors using the cross-attention network 306. As such, the cross-attention network 306 processes a normal distribution of the latent vectors using $\mu_L$ and $s_L$ for identifying uncertainty. A self-attention network 308 then compares vectors for K, V, and Q( $\mathfrak{R}$) against themselves for learning deep and conditioned latent representations regarding relationships about the data.

Regarding outputs, the self-attention network 308 outputs are combined with the cross-attention network 306 for forming mean and standard deviation-related pairs about the conditioned latent representations. The self-attention network 308 processes the data embeddings and projections about $\mu_L$ and $s_L$ in a dimensionally reduced space. In this way, conditioning introduces scene-specific local information while factoring global observations about a dataset describing a scene, thereby improving scale predictions. The estimation system 170 also factors and quantifies data uncertainty, thereby allowing the decoding to generate diverse depth maps that improve system robustness.

Moreover, P( $\mathfrak{R}|\varepsilon$) may represent the conditioned latent representation $\mathfrak{R}_C$ derived by the encoder 304. This distribution Q( $\mathfrak{R}$) may be restricted to a distribution family simpler than P( $\mathfrak{R}|\varepsilon$) and inference if performed by selecting the distribution that minimizes a dissimilarity function D(Q∥P). In one approach, the estimation system 170 executes a Kullback-Leibler (KL) divergence of Q from P as the dissimilarity function:

$$D_{KL}(Q\|P) \triangleq \sum_{\mathcal{R}} Q(\mathcal{R}) \log \frac{Q(\mathcal{R})}{P(\mathcal{R}|\mathcal{E})}. \quad \text{Equation (1)}$$

Here, the encoder 304 doubles the dimensionality of $\mathfrak{R}$ to $N_l \times 2D_l$, with each half storing respectively the mean $\mu_l$ and standard deviation $\sigma_l$ of the variational distribution. After conditioning $\mathfrak{R}_C$ with the data embeddings 302, the encoder 304 generates $\varepsilon = \varepsilon_I \oplus \varepsilon_G$ and $N_l \times D_l$ that can be sampled to derive latent representation $\mathfrak{R}_s$.

Regarding further predictions, the decoder 310 generates scaled depth maps by sampling from $N(\mu_c, \sigma_c)$ and inferring pixel uncertainty. A cross-attention network 312 factors the calibration information 240 about a camera for the samples K and V, thereby accounting for geometric effects that degrade scaling. The decoder 310 receives a vector of features per pixel from the cross-attention network 312 and a linear function converts high-dimensional values to an individualized value. Furthermore, as previously explained, the learning model 300 infers the scale priors using known priors since the scale priors were unknown during training. For example, the known priors represent appearance characteristics about objects (e.g., street signs) that are absolute within the scene but lack depth. As such, the estimation system 170 can accurately learn scale using data from a single-view rather than multiple-views (i.e., multiple cameras), thereby reducing hardware costs and system complexity.

Moreover, the scale is substantially consistent across cameras and metric formats without post-processing when compared to ground-truths acquired from the LIDAR sensors 124. In this way, the estimation system 170 can transfer the scale priors to systems (e.g., vehicle systems) having sensors with geometric properties that differ from the calibration information 240 for estimated scaled depth maps. Accordingly, the decoder 310 outputs scaled depth maps that vary with uncertainty, thereby adding diversity for downstream tasks to reliably perform complex tasks (e.g., path planning).

In various implementations, the estimation system 170 outputs scaled depth maps that include pixel locations that are excessively uncertain for the data embeddings 302. The source of the uncertainty can be a monocular camera that generated a single dataset and the single dataset was unknown to the learning model 300 during training. As such, the estimation system 170 selectively removes the pixel locations having increased uncertainty from the scaled depth maps. For example, the estimation system 170 removes certain pixels according to current lighting (e.g., indoors, outdoors, etc.) and demands of downstream tasks (e.g., lane tracking), thereby improving the clarity of the scaled depth maps.

Now turning to training, the estimation system 170 generates a single sample and an additional KL divergence loss regularizes variational distributions. During inference, multiple samples $\{\mathcal{R}_s^n\}_{n=1}^N$ can be generated from the same $\mathfrak{R}_C$, leading to various depth maps $\widetilde{D_n}$ decoded, thereby outputting diverse predictions. As explained above, the scaled maps include predictions that statistically approximate per-pixel depth uncertainty. As such, the estimation system 170 can improve performance by selectively removing pixels with high uncertainty values. In this regard, consider that a pixel $p_{ij}$ has a mean $\mu_{ij}$ and standard deviation $\sigma_{ij}$ given by:

$$\mu_{ij} = \frac{1}{N}\sum_N \tilde{d}_{ij}^n$$

$$\sigma_{ij} = \sqrt{\frac{\sum_N (\tilde{d}_{ij}^n - \mu_{ij})^2}{N}}.$$

Equations (2)

In various implementations, training the estimation system 170 involves some depth supervision, surface normal regularization, and KL divergence. Here, a weight coefficient (e.g., $\alpha_D=1$) is associated with these factors. As such, the loss function may be:

$$\mathcal{L} = \mathcal{L}_D + \alpha_N \mathcal{L}_N + \alpha_K \mathcal{L}_K.$$

Equation (3)

For depth supervision, a smooth L1 loss supervises depth predictions $\widetilde{D_t}$ relative to ground-truth depth maps $D_t$. Assuming $\Delta d_{ij} = |d_{ij} - \widetilde{d_{ij}}|$ to be the pixel-wise absolute depth error, we have:

$$\mathcal{L}_D = \frac{1}{N}\sum_{ij\in D_t}\begin{cases} 0.5*\Delta d^2/\beta & \text{if } \Delta d < \beta \\ \Delta d - 0.5*\beta & \text{otherwise} \end{cases},$$

Equation (4)

where N are valid pixels $p_{ij}=(u, v)$ in $D_t$, and $\beta$ is a threshold for loss changes.

Moreover, surface normal regularization leverages the dense labels from synthetic datasets for minimizing the error between normal vectors produced by a ground-truth and predicted depth maps. For a pixel p, a normal vector $n \in \mathbb{R}^3$ can be defined as:

$$n = (P_{u+1,v} - P_{u,v}) \times (P_{u,v+1} - P_{u,v}),$$

Equation (5)

where $P_{ij}=(x, y, z)=d_{ij} K_t^{-1}[u, v, 1]^T$ is the unprojection of p into a 3D space. As a measure of proximity between vectors, the estimation system 170 can compute the cosine similarity metric:

$$\mathcal{L}_N = \frac{1}{2N}\sum_{p\in D}\left(1 - \frac{\hat{n}\cdot n}{\|\hat{n}\|\|n\|}\right).$$

Equation (6)

As previously explained, the estimation system 170 may use KL divergence of Q from P as the dissimilarity function associated with deriving the probabilistic distributions. As such, the estimation system 170 minimizes the KL divergence of variational latent representations, thereby improving learning of the probabilistic distributions (e.g., Gaussian) for sampling. For example, the loss calculation for KL divergence may be:

$$\mathcal{L}_{KL} = -\frac{1}{2N}\sum_{ij\in D_t} 1 + s_{ij} - u_{ij}^2 - \exp(s_{ij}),$$

Equation (7)

where $\mu$ is the mean and $s=\log \sigma^2$ is the log-variance of our conditioned latent representation.

Figure 4:
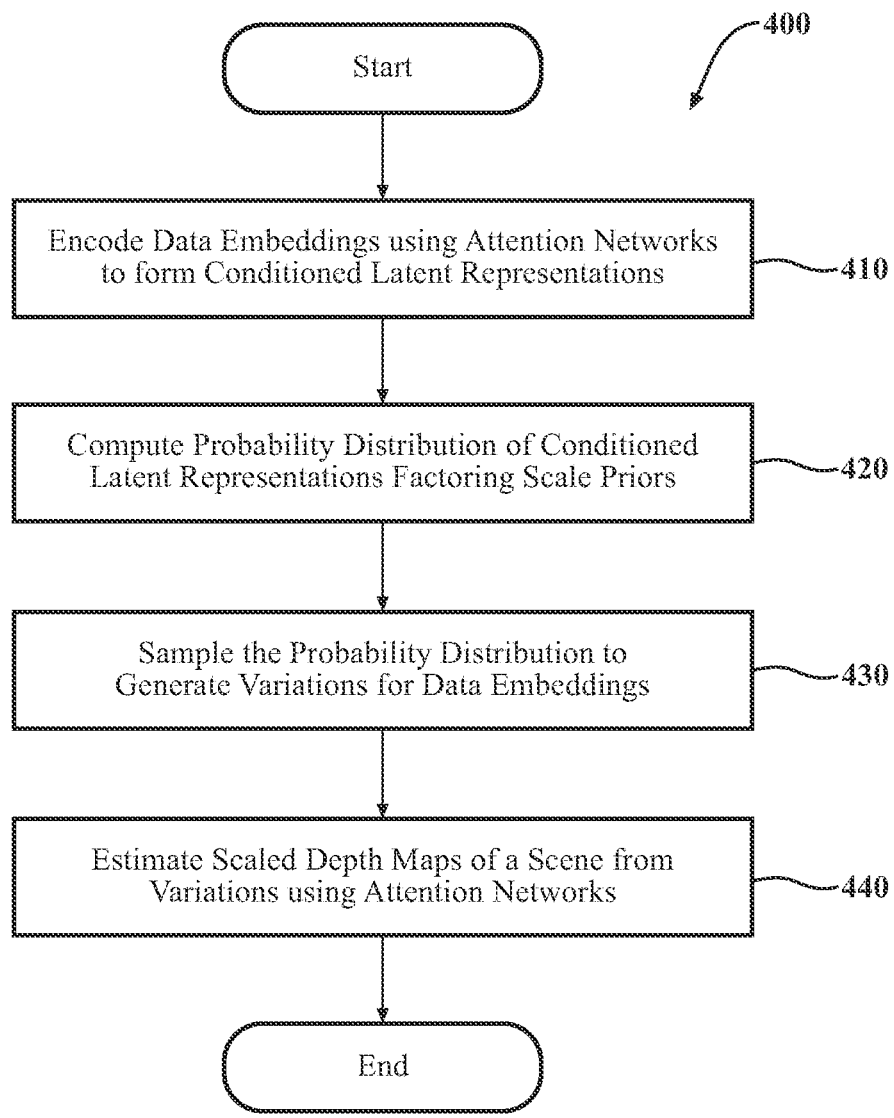
FIG. 4 illustrates one embodiment of a method that is associated with estimating scaled depth maps by sampling a probability distribution of latent representations from a learning model.

Now turning to FIG. 4, a flowchart of a method 400 that is associated with estimating scaled depth maps by sampling a probability distribution of latent representations from a learning model is illustrated. Method 400 will be discussed from the perspective of the estimation system 170 of FIGS. 1 and 2. While method 400 is discussed in combination with the estimation system 170, it should be appreciated that the method 400 is not limited to being implemented within the estimation system 170 but is instead one example of a system that may implement the method 400. Furthermore, as previously explained, the estimation system 170 through zero-shot learning and factoring scale priors predicts features (e.g., vehicle depth) about samples and objects absent during training. In this way, the estimation system 170 is transferrable notwithstanding the calibration information 240 and scene geometries since the decoder and the encoder are decoupled through sampling rather than direct connections and zero-shot learning.

At 410, the estimation system 170 encodes data embeddings using attention networks to form conditioned latent representations. As previously explained, the estimation system 170 can preprocess data (e.g. red-green-blue (RGB) values) acquired from a camera to extract features for combining with the calibration information 240 into the data embeddings. Here, the calibration information 240 can have properties about a geometric model representing the monocular camera. For example, the properties are focal length, aperture, orientation, field-of-view, resolution, and so on. As such, the estimation system 170 uses the extracted features and camera properties instead of raw values for increasing computational efficiency.

Moreover, the estimation system 170 can maintain variational latent representations with global significance about the data embeddings for conditioning that are derived from a single image. In this regard, a cross-attention network compares the data embeddings by projections on the latent vectors. Here, the cross-attention network processes a normal distribution of the latent vectors using $\mu_L$ and $s_L$ for identifying uncertainty. As explained above, a self-attention network compares vectors of the data embeddings and the variational latent representations against themselves to learn deep and conditioned latent representations.

At 420, the estimation system 170 computes a probability distribution of the conditioned latent representations factoring scale priors. A self-attention network processes the data embeddings and projections of $\mu_L$ and $s_L$ in a dimensional space that is reduced for identifying significant positions within the data. The self-attention network outputs are combined with the cross-attention network for forming mean and standard deviation-related pairs of the conditioned latent representations that a decoder samples. Through conditioning, the estimation system 170 introduces scene-specific local information while factoring global observations about a dataset describing a scene. Regarding factoring scale priors, as previously explained, the estimation system 170 infers the scale priors using known priors since the scale priors were unknown during training. For example, the known priors represent appearance characteristics about objects (e.g., street signs) that are absolute within the scene but lack depth. The derived scale is substantially consistent across cameras and metric without post-processing when compared to ground-truths acquired from the LIDAR sensors 124. As such, the estimation system 170 can transfer the scale priors to vehicles having sensors with geometric properties that differ from the calibration information 240 for estimated scaled depth maps. Accordingly, the estimation system 170 quantifies data uncertainty and factors scale priors, thereby allowing the decoding to generate reliable depth maps that improve system robustness and transferability.

At 430, the estimation system samples the probability distribution to generate variations for the data embeddings. After conditioning, the estimation system 170 generates mean and standard deviation values about the conditioned latent representations for sampling by decoding. Here, variations in the data may be reflected by the mean and standard deviation values. For example, the estimation system 170 samples from $N(\mu_c, \sigma_c)$ and infers pixel uncertainty for decoding into scaled depth maps. Accordingly, the estimation system 170 can sample the conditioned latent representations to generate multiple predictions from probabilistic distributions, thereby improving the transferability of the estimation system 170 and robustness for single-frame processing.

At 440, the prediction module 220 estimates scaled depth maps of a scene from the variations using attention networks. In one approach, a cross-attention network factors the calibration information 240 about a camera and compares the calibration information 240 against the variations, thereby accounting for geometric effects that degrade scaling. Decoding generates a vector of features per pixel from the cross-attention network and a linear function may convert high-dimensional values to an individualized value.

In various implementations, as previously explained, the estimation system 170 outputs scaled depth maps that include pixel locations that are excessively uncertain for the data embeddings. The source of the uncertainty can be a monocular camera that generated a single dataset and the single dataset was unknown to the learning model 300 during training. As such, the estimation system 170 selectively removes the pixel locations having increased uncertainty from the scaled depth maps. For example, the estimation system 170 removes certain pixels according to current lighting (e.g., indoors, outdoors, etc.) and demands of downstream tasks (e.g., lane tracking), thereby improving the clarity of the scaled depth maps. Accordingly, the estimation system 170 can estimate scaled depth maps by sampling the conditioned latent representations to generate multiple predictions from probabilistic distributions about a single image, thereby improving the transferability of the learning model and robustness for single-frame processing.

Figure 5:
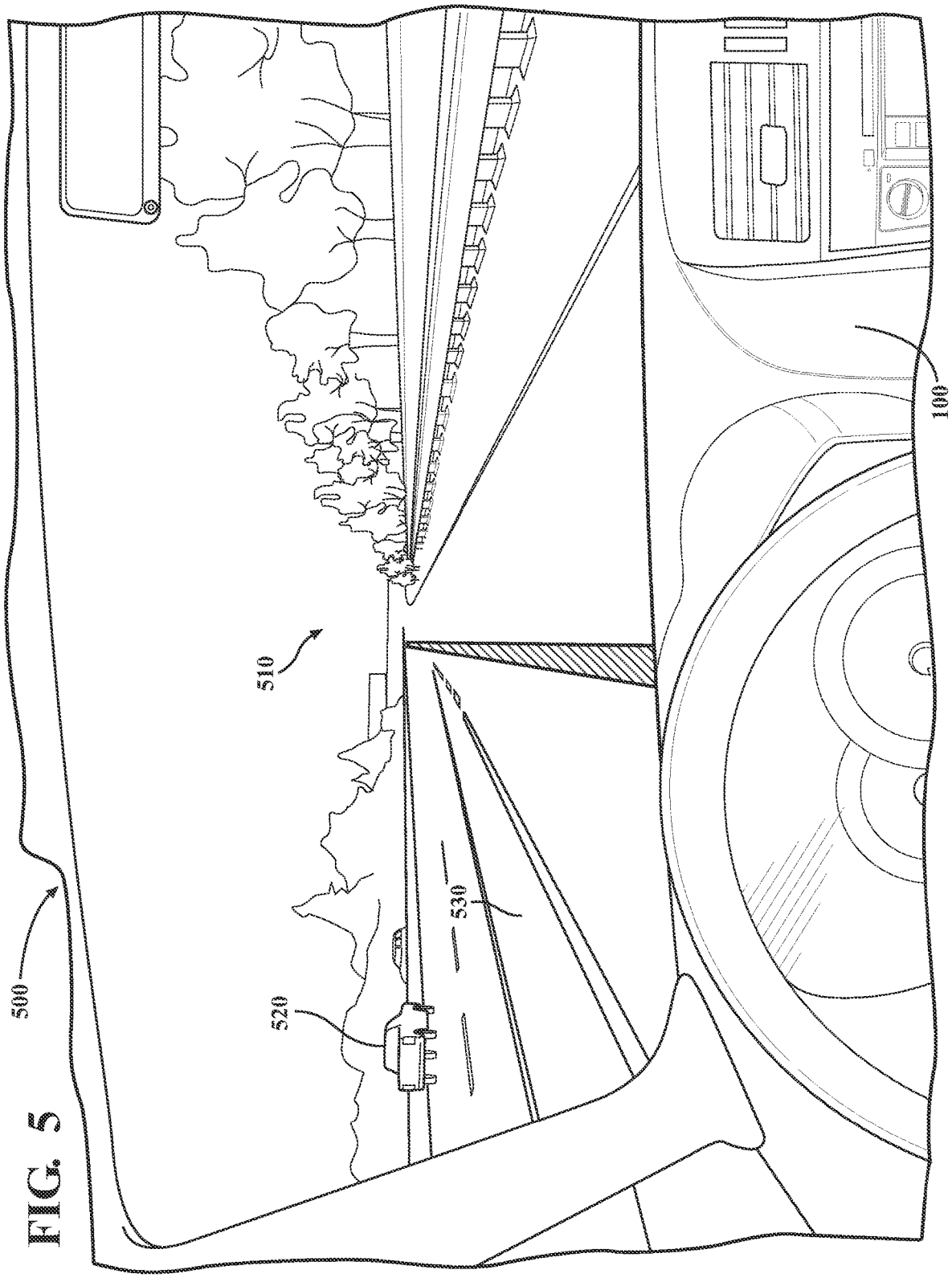
FIG. 5 illustrates an example of a vehicle implementing the estimation system on a road to predict scaled depth maps about a scene.

Now turning to FIG. 5, an example of the vehicle 100 implementing the estimation system 170 on a road 500 to predict scaled depth maps about a scene is illustrated. In one approach, the vehicle 100 encodes data using the estimation system 170 about the driving scene 510 having the truck 520. The vehicle 100 predicts scaled depth maps for path planning by the automated driving module 160 on the lane 530. The estimation system 170 computes a probability distribution of conditioned latent representations factoring scaling priors for sampling by decoding. The sampling may capture variations about the data embeddings for further decoding. As previously explained, decoding can involve a cross-attention network that factors the calibration information 240 about a camera and compares the calibration information 240 against the variations, thereby accounting for geometric effects that degrade scaling. Furthermore, decoding generates a vector of features per pixel from the cross-attention network and a linear function may convert high-dimensional values to an individualized value. Accordingly, the automated driving module 160 of the vehicle 100 plans a path on the lane 530 more reliably using the scaled depth maps, thereby improving safety and system performance.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the estimation system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the estimation system 170, and/or the automated driving module(s) 160 may control some or all of the vehicle systems 140 and, thus, may be partially or fully autonomous as defined by the society of automotive engineers (SAE) levels 0 to 5.

The processor(s) 110, the estimation system 170, and/or the automated driving module(s) 160 can be operatively connected to communicate with the various vehicle systems 140 and/or individual components thereof. For example, the processor(s) 110, the estimation system 170, and/or the automated driving module(s) 160 can be in communication to send and/or receive information from the various vehicle systems 140 to control the movement of the vehicle 100. The processor(s) 110, the estimation system 170, and/or the automated driving module(s) 160 may control some or all of the vehicle systems 140.

The processor(s) 110, the estimation system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the estimation system 170, and/or the automated driving module(s) 160 can control the direction and/or speed of the vehicle 100. The processor(s) 110, the estimation system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the estimation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An estimation system comprising:
a memory storing instructions that, when executed by a processor, cause the processor to:
encode data embeddings by a learning model to form conditioned latent representations using attention networks, the data embeddings including features about an image from a camera and calibration information about the camera;
compute a probability distribution of the conditioned latent representations by factoring scale priors;
sample the probability distribution to generate variations for the data embeddings; and
estimate scaled depth maps of a scene from the variations at different coordinates using the attention networks.

2. The estimation system of claim 1, wherein the instructions to encode the data embeddings further include instructions to:
maintain by the learning model latent vectors associated with the conditioned latent representations;
project the data embeddings onto the latent vectors by a cross-attention network of the attention networks using a normal distribution of the latent vectors; and
output mean and standard deviation pairs of the conditioned latent representations using the data embeddings and the features by a self-attention network of the attention networks, and the self-attention network operates in a dimensional space that is reduced.

3. The estimation system of claim 1, wherein the instructions to estimate the scaled depth maps further include instructions to:
decode the probability distribution to generate latent vectors; and
predict depth values for the scaled depth maps using the latent vectors and the calibration information by a cross-attention network of the attention networks, and the calibration information includes geometric properties about the camera.

4. The estimation system of claim 1 further including instructions to:
infer by the learning model the scale priors using known priors acquired during training, and the scale priors were unknown during the training and the known priors represent appearance characteristics about objects within the scene that lack depth information.

5. The estimation system of claim 4 further including instructions to:
transfer the scale priors to a vehicle having a sensor that acquires an image dataset, wherein the sensor has geometric properties that differ from the calibration information.

6. The estimation system of claim 1, wherein the scaled depth maps include pixel locations that are uncertain for the data embeddings.

7. The estimation system of claim 6 further including instructions to:
remove the pixel locations having increased uncertainty from the scaled depth maps according to the scene being indoors.

8. The estimation system of claim 1, wherein the camera is a monocular camera that generates a single dataset for the image and the single dataset was unknown to the learning model during training.

9. The estimation system of claim 1, wherein the conditioned latent representations include local information that factors global latent representations about the scene.

10. A non-transitory computer-readable medium comprising:
instructions that when executed by a processor cause the processor to:
encode data embeddings by a learning model to form conditioned latent representations using attention networks, the data embeddings including features about an image from a camera and calibration information about the camera;
compute a probability distribution of the conditioned latent representations by factoring scale priors;
sample the probability distribution to generate variations for the data embeddings; and
estimate scaled depth maps of a scene from the variations at different coordinates using the attention networks.

11. The non-transitory computer-readable medium of claim 10, wherein the instructions to encode the data embeddings further include instructions to:
maintain by the learning model latent vectors associated with the conditioned latent representations;
project the data embeddings onto the latent vectors by a cross-attention network of the attention networks using a normal distribution of the latent vectors; and
output mean and standard deviation pairs of the conditioned latent representations using the data embeddings and the features by a self-attention network of the attention networks, and the self-attention network operates in a dimensional space that is reduced.

12. A method comprising:
encoding data embeddings by a learning model to form conditioned latent representations using attention networks, the data embeddings including features about an image from a camera and calibration information about the camera;
computing a probability distribution of the conditioned latent representations by factoring scale priors;
sampling the probability distribution to generate variations for the data embeddings; and
estimating scaled depth maps of a scene from the variations at different coordinates using the attention networks.

13. The method of claim 12, wherein encoding the data embeddings further includes:
maintaining by the learning model latent vectors associated with the conditioned latent representations;
projecting the data embeddings onto the latent vectors by a cross-attention network of the attention networks using a normal distribution of the latent vectors; and
outputting mean and standard deviation pairs of the conditioned latent representations using the data embeddings and the features by a self-attention network of the attention networks, and the self-attention network operates in a dimensional space that is reduced.

14. The method of claim 12, wherein estimating the scaled depth maps further includes:
decoding the probability distribution to generate latent vectors; and
predicting depth values for the scaled depth maps using the latent vectors and the calibration information by a cross-attention network of the attention networks, and the calibration information includes geometric properties about the camera.

15. The method of claim 12 further comprising:
inferring by the learning model the scale priors using known priors acquired during training, and the scale priors were unknown during the training and the known priors represent appearance characteristics about objects within the scene that lack depth information.

16. The method of claim 15 further comprising:
transferring the scale priors to a vehicle having a sensor that acquires an image dataset, wherein the sensor has geometric properties that differ from the calibration information.

17. The method of claim 12, wherein the scaled depth maps include pixel locations that are uncertain for the data embeddings.

18. The method of claim 17 further comprising:
removing the pixel locations having increased uncertainty from the scaled depth maps according to the scene being indoors.

19. The method of claim 12, wherein the camera is a monocular camera that generates a single dataset for the image and the single dataset was unknown to the learning model during training.

20. The method of claim 12, wherein the conditioned latent representations include local information that factors global latent representations about the scene.

* * * * *